United States Patent
Komukai et al.

(10) Patent No.: US 7,823,889 B2
(45) Date of Patent: Nov. 2, 2010

(54) SEAL PART

(75) Inventors: Kei Komukai, Tokyo (JP); Tetsuya Iguchi, Tokyo (JP); Hidetoshi Kasahara, Tokyo (JP)

(73) Assignee: Eagle Industry Aerospace Co., Ltd., Tokyo (JP)

( * ) Notice: Subject to any disclaimer, the term of this patent is extended or adjusted under 35 U.S.C. 154(b) by 479 days.

(21) Appl. No.: 11/663,808

(22) PCT Filed: Mar. 30, 2005

(86) PCT No.: PCT/JP2005/006178

§ 371 (c)(1), (2), (4) Date: Mar. 26, 2007

(87) PCT Pub. No.: WO2006/038328

PCT Pub. Date: Apr. 13, 2006

(65) Prior Publication Data

US 2007/0284828 A1 Dec. 13, 2007

(30) Foreign Application Priority Data

Sep. 30, 2004 (JP) ............................. 2004-288749

(51) Int. Cl.
*F16J 15/02* (2006.01)
(52) U.S. Cl. ...................................... 277/647; 277/654
(58) Field of Classification Search ................ 277/500, 277/504, 529, 534, 628, 644, 647, 650, 654
See application file for complete search history.

(56) References Cited

U.S. PATENT DOCUMENTS

| 4,218,067 A * | 8/1980 | Halling ........................ 277/605 |
| 5,185,217 A * | 2/1993 | Miyamoto et al. .......... 428/627 |
| 6,054,225 A * | 4/2000 | Harayama et al. .......... 428/667 |
| 6,203,021 B1 * | 3/2001 | Wolfla et al. ................. 277/415 |

FOREIGN PATENT DOCUMENTS

| JP | 55-152171 | 11/1980 |
| JP | 60-251264 | 12/1985 |
| JP | 05-149432 | 6/1993 |
| JP | 06-220690 | 8/1994 |
| JP | 2002-225164 | 8/2002 |
| JP | 2003-120327 | 4/2003 |

* cited by examiner

*Primary Examiner*—Vishal Patel
*Assistant Examiner*—Gilbert Y Lee
(74) *Attorney, Agent, or Firm*—Arent Fox LLP

(57) ABSTRACT

A seal part having a base material, a porous coating layer formed by flame spraying a hard material on a seal surface of the base material, and a lubricating film containing one or more types of materials selected from silver, gold, and tin and a gold-cobalt alloy on the porous coating layer. The seal part of the present invention has superior durability and sealability and further a long life and high reliability even when used in a high temperature (for example 400° C. or more, in particular 400 to 600° C.) and high pressure (for example 2 MPa or more) environment.

6 Claims, 15 Drawing Sheets

SEAL PART

CROSS-REFERENCE TO RELATED APPLICATION

This application is a National Stage entry of International Application No. PCT/JP2005/006178, filed Mar. 30, 2005, the entire specification claims and drawings of which are incorporated herewith by reference.

TECHNICAL FIELD

The present invention relates to a for example a tube seal, gasket, or other seal part, more particularly relates to a seal part superior in sealability, long in life, and high in reliability even at a high temperature and high pressure.

BACKGROUND ART

A jet engine or other various types of engines are generally provided with a duct as ancillary equipment for carrying oily gas or exhaust discharged from the engine. The duct provided for this purpose is required to carry the oily gas or exhaust from the engine without leakage to the outside.

The oily gas or exhaust discharged from an engine is generally high in temperature and high in pressure. In particular, along with improvements in engine performance, the oily gas or exhaust ends to become higher in temperature and higher in pressure. For this reason, the duct used for an engine ends up deforming due to the heat by the oily gas or exhaust, the pressure and the load and as a result is usually formed with a moving part so as to keep from this leading to breakage.

As such a duct moving part, a bellows type, piston ring type, tube seal type, etc. may be illustrated. Among these, from the viewpoint of the reduction of weight and cost, a tube seal type including a seal part is suitably used.

In the tube seal type, usually a tube seal and a carbon bushing are combined for use. However, when using a carbon bushing, there is the inconvenience that use at a high temperature, in particular 400° C. or so, is not possible. On the one hand, for a tube seal able to handle a high temperature, for example, the method of coating the seal surface with a nickel-based flame spraying material, cobalt-based flame spraying material, hard chrome plating, etc. have been proposed (for example, see Patent Document 1).

In Patent Document 1, a tube seal given a hard chrome plating at the seal surface is disclosed. However, with the tube seal described in this document, there was the problem that while the durability under a high temperature environment can be improved, the seal characteristics were insufficient.

Further, this inconvenience occurred not only when coating the seal surface by hard chrome plating as described in Patent Document 1, but also when using the above flame spraying material. When using this flame spraying material to coat a seal surface, the flame sprayed coating surface is rough, so it was necessary to polish the seal surface until the necessary surface smoothness. In particular, when using the flame spraying material to coat the seal surface, to secure the seal performance, it was necessary to coat not only the seal surface of the tube seal, but also the seal surface of the opposing side flange. However, when coating the seal surface of a flange, there was the problem that depending on the shape or size of the flange, this polishing ended up becoming difficult.

On the other hand, Patent Document 2 discloses a solid lubrication roller bearing obtained by coating the surface generating the rolling friction or sliding friction with TiN or TiCN to form a hard layer and forming on this hard layer a solid lubrication coating comprised of lead. Further, Patent Document 3 discloses a bearing obtained by providing the surfaces of the bearing bodies moving relative to each other with a reactive coating of metal compound with one or more types of gas by physical vapor deposition and forming a solid lubricant or oil film on the same.

In these Patent Documents 2 and 3, the hard layer (Patent Document 2) or reactive coating of metal compound (Patent Document 3) is formed by ion plating. However, when forming a hard layer or reactive coating of metal compound by ion plating like in these documents, the thickness ends up becoming an extremely thin one of several microns or so. For this reason, when forming parts of the base material with a small thickness such as the seal surface of a seal part by such a hard layer or reactive coating of metal compound, the durability ends up becoming insufficient and as a result application to the seal part becomes impossible.

Patent Document 1: Japanese Patent Publication (A) No. 2003-120327
Patent Document 2: Japanese Utility Model Publication (U) No. 5-67818
Patent Document 3: Japanese Patent Publication (A) No. 62-258224

DISCLOSURE OF INVENTION

Problem to be Solved by the Invention

The present invention was made in consideration of this situation and has as its object the provision of a seal part having a superior durability and sealability, long in life, and high in reliability even when used under a high temperature (for example 400° C. or more, in particular 400 to 600° C.) and high pressure (for example 2 MPa or more) environment and a tube seal and gasket having this seal part. In particular, the present invention has as its object the provision of a seal part able to be suitably used in a location accompanied with relative sliding under a high temperature, high pressure environment.

Means for Solving the Problem

The inventors discovered that the above object can be achieved by forming on the seal surface a porous coating layer containing a hard material and forming on this porous coating layer a lubricating film containing one or more of materials selected from silver, gold, and tin and a gold-cobalt alloy and thereby completed the present invention.

That is, the seal part according to the present invention is comprised of
 a base material,
 a porous coating layer formed by flame spraying a hard material on a seal surface of the base material, and
 a lubricating film containing one or more types of materials selected from silver, gold, and tin and a gold-cobalt alloy on the porous coating layer.

In the present invention, the seal surface of the seal part is formed with a porous coating layer containing a hard material. For this reason, the seal surface can be increased in hardness and the durability of the seal surface under a high temperature, high pressure environment can be improved. Note that in the present invention, the "hard material forming the porous coating layer" means a material having a hardness equal to that of the base material or a material having a hardness higher than that of the base material.

Further, in the present invention, the porous coating layer is further formed with a lubricating film containing a soft material selected from silver, gold, and tin and a gold-cobalt alloy. For this reason, in this lubricating film, at the time of high temperature use, the silver, gold, tin or gold-cobalt material forming this lubricating film softens. Then, the softened silver, gold, tin or gold-cobalt material is transferred and adhered to the seal surface of the opposing member by contact or sliding to form a lubricating surface comprised of these soft materials. Therefore, according to the present invention, a seal surface having a low friction and high sealability in particular at the time of high temperature use can be formed.

Further, in the present invention, since the softened silver, gold, tin or gold-cobalt material is transferred and adhered to the seal surface of the opposing member, a superior sealability can be exhibited even without particularly treating the seal surface of the opposing member to improve the sealability. That is, according to the present invention, it is possible to improve the sealability even without treating both the seal part and the opposing member to improve the sealability like in the past, and it is possible to greatly simplify the production process.

Further, in the present invention, since the porous coating layer is formed with a denser lubricating film, it is possible to simplify the polishing process of the porous coating layer considered necessary in the past. That is, in the present invention, it is possible to adopt a process of forming the base material with the porous coating layer, applying simple polishing, then forming a dense lubricating film by plating.

The lubricating film should contain at least one of the silver, gold, tin or gold-cobalt, but for example a combination of two or more of these such as silver and gold is also possible.

In the present invention, the porous coating layer is formed by flame spraying a hard material, so it is possible to form a coating layer having a predetermined range of porosity. For this reason, it is possible to improve the adhesion between the porous coating layer and the lubricating film containing at least one of silver, gold, tin or gold-cobalt. Note that in the above Patent Document 2 (Japanese Utility Model Publication (U) No. 5-67818) and Patent Document 3 (Japanese Patent Publication (A) No. 62-258224), a hard film comprised of a hard material is formed by ion plating. On the one hand, the hard film formed by this ion plating has the property of an extremely low porosity compared with the porous coating layer formed by the flame spraying method of the present invention. For this reason, for example, when forming a lubricating film comprised of a soft material such as silver, gold, tin or gold-cobalt on a hard film formed by ion plating like in Patent Documents 2 and 3, the adhesion between this hard film and lubricating film ends up becoming insufficient and the performance as a seal part ends up falling.

In the seal part of the present invention, preferably the porous coating layer is comprised of a flame spraying material containing one or more types of materials selected from a nickel based alloy, cobalt based alloy, chromium carbide, and tungsten carbide.

In the seal part of the present invention, the thickness of the porous coating layer is preferably 10 to 200 µm, more preferably 20 to 50 µm.

In the present invention, to make the hardness of the porous coating layer a predetermined range, it is preferable to make the thickness the above range. If the thickness of the porous coating layer is too great, the amount of flexible deformation (trackability) tends to end up falling. Conversely, if the thickness is too small, the durability (lifetime) ends up falling.

In the seal part of the present invention, the thickness of the lubricating film is preferably 1 to 50 µm, more preferably 5 to 20 µm, further preferably 10 to 20 µm.

If the lubricating film is too thin, parts end up occurring where lubricating film is not formed locally due to sliding, breakage occurs due to the direct sliding of the porous coating layer and opposing material, and the sealability tends to end up falling. On the other hand, if too thick, the contact area with the opposing member ends up becoming too large and the sliding resistance tends to end up increasing. Note that when the lubricating film is too thin, even if forming the porous coating layer by the flame spraying method and making the porosity a predetermined range, the amount of soft material entering the pores of the porous coating layer ends up becoming insufficient and therefore the sealability tends to end up falling.

In the seal part of the present invention, preferably the base material is a base material comprised of a nickel based alloy.

The seal part of the present invention is preferably a seal part used in a range of temperature of 400 to 600° C.

In the seal part of the present invention, preferably the seal part is a tubular seal part having a flexible part flexibly deformable in a radial direction, and the flexible part has a seal surface.

The tube seal of the present invention has a tubular body and any one of the above seal parts.

The gasket of the present invention is comprised of any one of the above seal parts and has an E-shaped or W-shaped cross-sectional shape.

In the present invention, since the seal surface of the seal part used in a tube seal, gasket, etc. is formed with the porous coating layer and lubricating film of the present invention, it can be used well even under a high temperature environment of preferably 400° C. or more, more preferably 400 to 600° C. For this reason, the seal part of the present invention can be suitably used for the tube seal or gasket of a duct part of a gas turbine etc. used under a high temperature, high pressure environment.

Effects of the Invention

According to the present invention, since the seal surface is formed with a porous coating layer containing a hard material and this porous coating layer is formed with a lubricating film containing one or more types of materials selected from silver, gold, and tin and a gold-cobalt alloy, it is possible to provide a seal part superior in durability and sealability, long in life, and high in reliability even if used under a high temperature (for example 400° C. or more, in particular 400 to 600° C.) and high pressure (for example 2 MPa or more) environment. In particular, according to the present invention, it is possible for example to provide a seal part able to be suitably used in a location accompanied with relative sliding in a high temperature, high pressure environment.

BEST MODE FOR WORKING THE INVENTION

Figure 1:
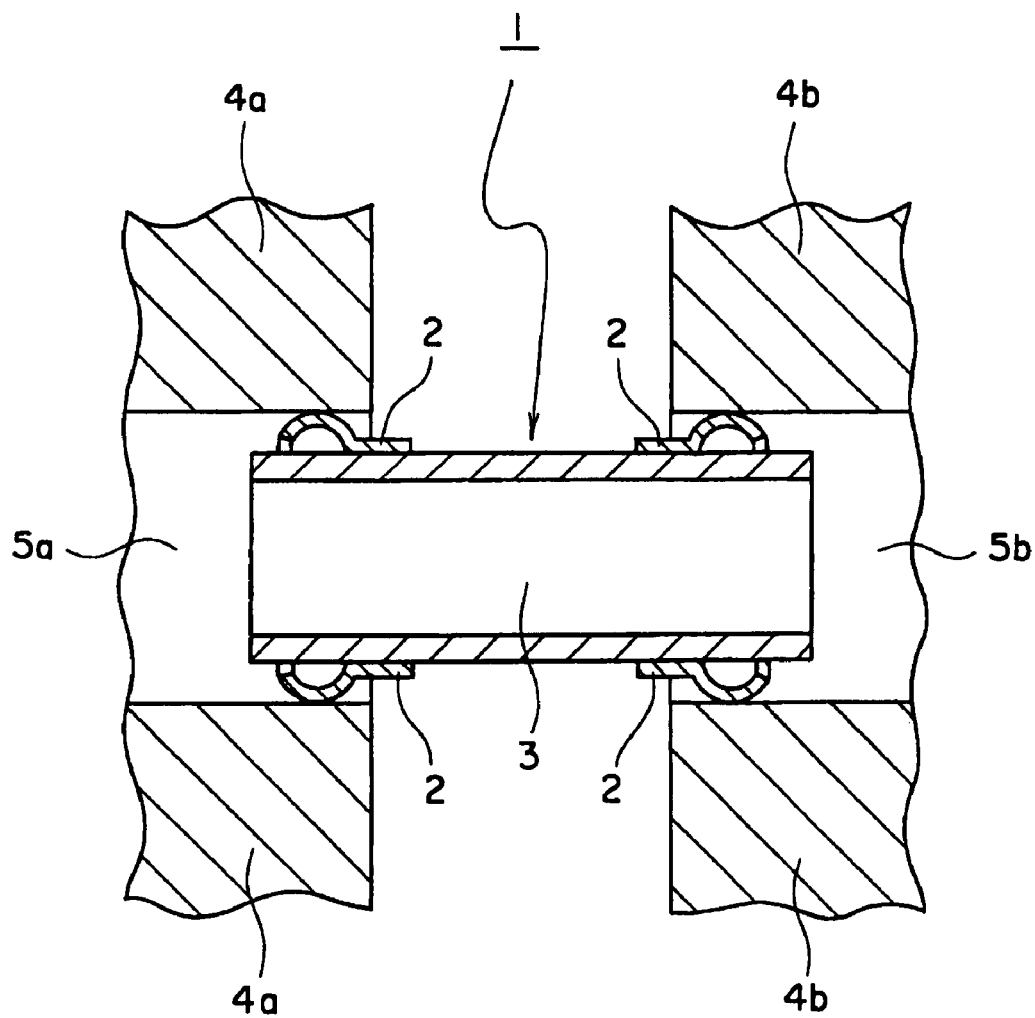
FIG. 1 is a cross-sectional view of a tube seal of an embodiment of the present invention.

Below, the present invention will be explained based on the embodiments shown in the drawings.

First Embodiment

As shown in FIG. 1, a tube seal 1 according to an embodiment of the present invention is comprised of a tubular body 3 and a pair of tubular seal parts 2 arranged at the two ends of this body 3. This body 3 and seal parts 2 are joined integrally at the outer circumference of the body 3 and the inner circumference of the seal part 2 by press-fitting, then welding etc.

This tube seal 1 connects through a pair of seal parts 2 a tubular first channel forming member 4a and a second channel forming member 4b to form a moving part. That is, the tube seal 1 forms a channel through which fluid can freely flow between a first channel 5a formed by the first channel forming member 4a and a second channel 5b formed by the second channel forming member 4b through the hollow part of the tubular body 3 so as to thus configure a moving part.

In the present embodiment, the fluid in the first and second channels 5a, 5b formed by the first and second channel forming members 4a, 4b is sealed by the seal surfaces formed by the seal parts 2 and the inside walls of the first and second channel forming members 4a, 4b. In particular, in the present embodiment, since the seal parts 2 are configured as explained later, deformation due to heat or pressure can be efficiently absorbed and a high durability and sealability can be exhibited even if the fluid in the channels 5a, 5b have a high temperature (for example 400° C. or more, in particular 400 to 600° C.) and high pressure (for example 2 MPa or more).

Seal Part 2

Figure 2:
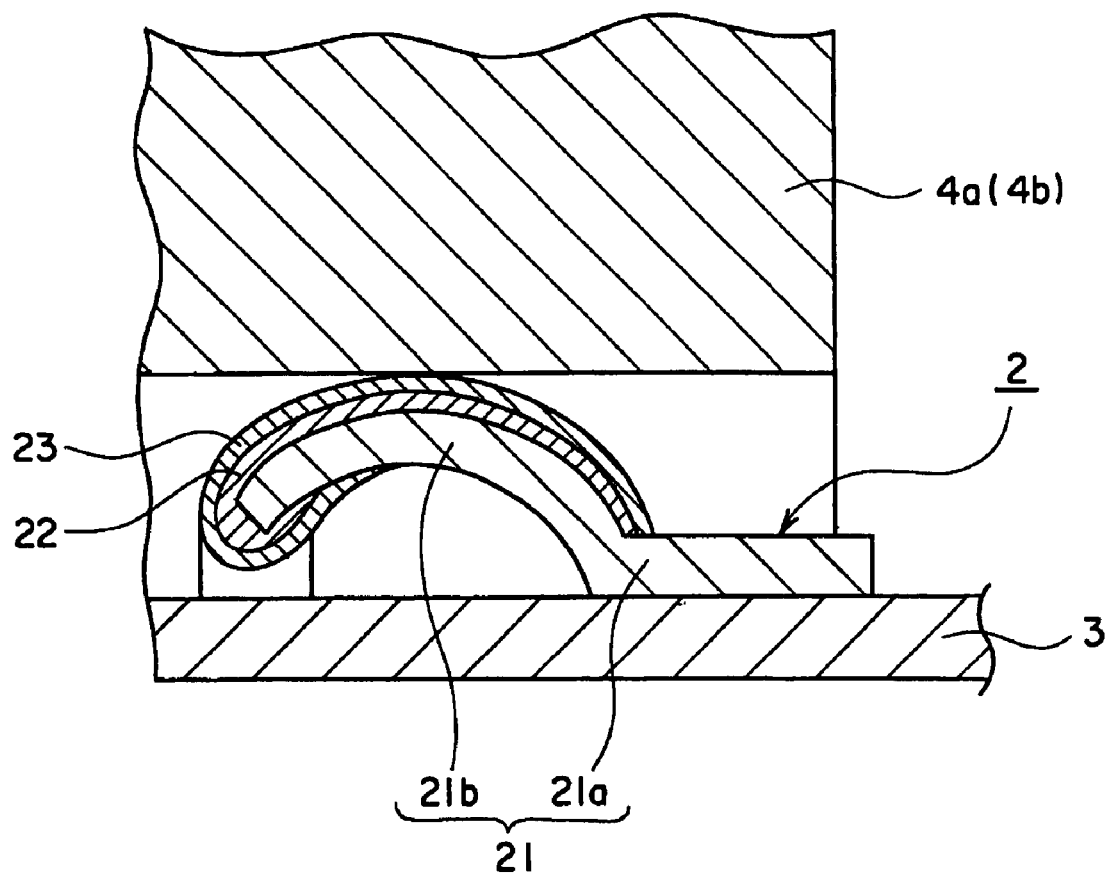
FIG. 2 is a cross-sectional view of principle parts of a tube seal according to an embodiment of the present invention.

As shown in FIG. 2, the seal part 2 of the present embodiment is a tubular part formed at the outer circumference of a body 3 and is comprised of a base material 21, a porous coating layer 22 formed on this base material, and a lubricating film 23 formed on this porous coating layer 22.

Figure 3:
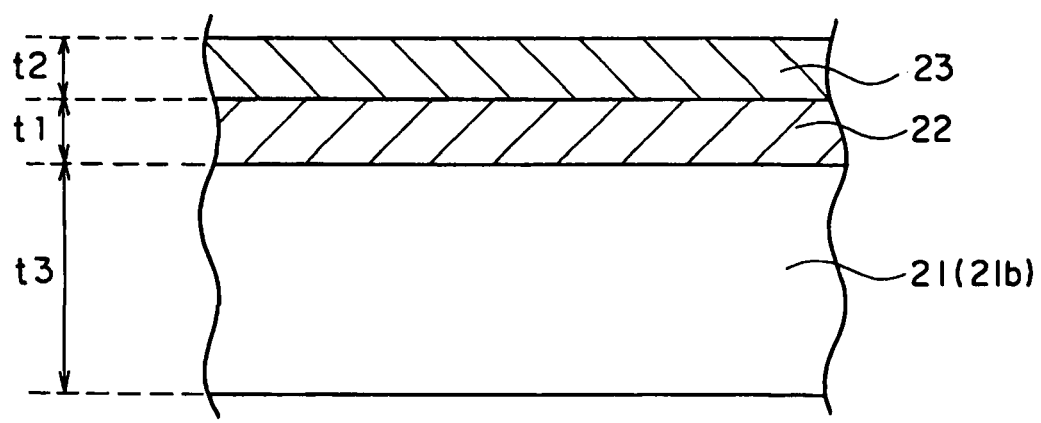
FIG. 3 is a cross-sectional view of principle parts of a seal part according to an embodiment of the present invention.

The base material 21 is comprised of a fixed part 21a and a flexible part 21b. The fixed part 21a is joined through its inner circumference to the outer circumference of the body 3 by press-fitting, then welding etc. to make the seal part 2 and the body 3 integral. On the other hand, the flexible part 21b, as shown in FIG. 2, has a shape bulging out to the outside diameter side and is designed to be flexibly deformable in the radial direction. Further, the surface of this flexible part 21b at the outside diameter side, as shown in FIG. 3, is formed with a porous coating layer 22 of a thickness t1. Further, this porous coating layer 22 is formed with a lubricating film 23 of a thickness t2.

The material forming the base material 21 is not particularly limited, but a material able to be used even under a high temperature and high pressure environment is preferable. For example, a nickel based alloy etc. may be used. As the nickel based alloy, a nickel based alloy containing nickel (Ni) as the main ingredients and chromium (Cr), molybdenum (Mo), niobium (Nb), iron (Fe), titanium (Ti), etc. may be illustrated. Further, the thickness t3 of the base material 21 shown in FIG. 3 is preferably 0.1 to 1.0 mm or so.

The porous coating layer 22 formed on the flexible part 21b is comprised of a hard flame spraying material formed by the high velocity oxygen fuel flame spraying (HVOF) or other flame spraying method. In the present embodiment, by forming the porous coating layer 22 by the flame spraying method, the porosity of the porous coating layer 22 can be made a predetermined range. Further, by making the porosity of the porous coating layer 22 a predetermined range, the adhesion between the porous coating layer 22 and the lubricating film 23 can be improved. As the flame spraying material forming the porous coating layer 22, a flame spraying material containing a nickel based alloy or cobalt based alloy or other metal alloy or chromium carbide ($Cr_2C_3$), tungsten carbide (WC), or another metal carbide is preferable.

As the nickel based alloy, for example, an alloy containing nickel (Ni) as a main ingredient and chromium (Cr), molybdenum (Mo), silicon (Si), etc. may be used. As the cobalt based alloy, for example, an alloy containing cobalt (Co) as a main ingredient and chromium (Cr), molybdenum (Mo), silicon (Si), etc. may be used.

As the flame spraying material containing chromium carbide, in addition to chromium carbide ($Cr_2C_3$), a flame spraying material containing a nickel-chromium alloy (Ni—Cr) in an amount of preferably 7 to 25 wt % or so may be used. Further, as the flame spraying material containing tungsten carbide, in addition to tungsten carbide (WC), it is possible to use a flame spraying material containing cobalt (Co) in an amount of preferably 12 to 25 wt % or so.

The thickness t1 of the porous coating layer 22 is preferably 10 to 200 μm, more preferably 20 to 50 μm.

In the present embodiment, to make the hardness of the porous coating layer 22 a predetermined range, it is preferable to make the thickness the above range. If the thickness t1 of the porous coating layer 22 is too great, the amount of flexible deformation (trackability) tends to end up falling. Conversely, if the thickness t1 is too small, the coating adhesion strength of the porous coating layer 22 ends up becoming lower than that of the base material 21 and the durability (lifetime) ends up falling.

The lubricating film 23 formed on the porous coating layer 22 is a plating layer formed by plating a soft material containing at least one material selected from silver, gold, tin or gold-cobalt. The soft material contained in the lubricating film 23 is a material which softens under a high temperature, high pressure environment and can form a lubricating surface at the seal surface formed by the lubricating film 23 and the first and second channel forming members 4a, 4b.

Note that the lubricating film 23 may include at least one type of soft material out of the above silver, gold, tin or gold-cobalt. For example, silver and gold may be combined for use.

Further, the thickness t2 of the lubricating film 23 is preferably 1 to 50 μm, more preferably 5 to 20 μm, furthermore preferably 10 to 20 μm. If the lubricating film 23 is too thin, sliding will end up causing parts where the lubricating film 23 is locally not formed, the porous coating layer and the opposing members, that is, the first and second channel forming members 4a, 4b, will directly slide against each other resulting in breakage, and the sealability will end up dropping. On the other hand, if too thick, the contact area with the opposing members, that is, the first and second channel forming members 4a, 4b, will end up becoming larger, the sliding resistance will increase, and the function as a moving part will tend to no longer be fulfilled.

In the present embodiment, the flexible part 21b of the seal part 2 is formed with a porous coating layer 22 containing the above flame spraying material. For this reason, the seal surface of the flexible part 21b can be raised in hardness and the durability of the seal surface under a high temperature, high pressure environment can be raised.

Further, in the present embodiment, the porous coating layer 22 is formed with a lubricating film 23 containing a soft material containing one or more materials selected from silver, gold, and tin and gold-cobalt alloy. The soft material containing silver, gold, tin or gold-cobalt is a material having the feature of softening at a high temperature. For this reason, at the time silver, gold, tin or gold-cobalt of a high temperature, the softened material contained in the lubricating film 23 is transferred and adhered by the sliding action to the surfaces of the first and second channel forming members 4a, 4b contacting the lubricating film 23 (seal surfaces). Further, the seal surfaces between the lubricating film 23 and the first and second channel forming members 4a, 4b can be made lubricating surfaces comprised of the soft material and can form seal surfaces having low friction and high sealability.

Therefore, in the present embodiment, even if high temperature and high pressure fluid is used in the first and second channels 5a, 5b formed by the first and second channel forming members 4a, 4b, superior durability and sealability can be exhibited. In particular, the seal part 2 and tube seal 1 of the present embodiment can be used well even under a high temperature and high pressure environment and can be suitably used as couplings of duct parts of gas turbines etc.

Further, in the present embodiment, the sliding action under the high temperature environment causes the soft material contained in the lubricating film 23 to be transferred and adhered to the surfaces of the first and second channel forming members 4a, 4b contacting the lubricating film 23 (seal surfaces), so the seal surfaces of the first and second channel forming members 4a, 4b can exhibit superior sealability even without special treatment to improve the sealability. For this reason, according to the present embodiment, the production process can be greatly simplified.

Further, in the present embodiment, the porous coating layer 22 is formed with a lubricating film 23. For this reason, the process can be adopted of forming the porous coating layer 22, then polishing it simply, then forming a lubricating film 23 over it. That is, it is also possible to simplify the conventional polishing process of the porous coating layer 22.

Second Embodiment

Figure 4:
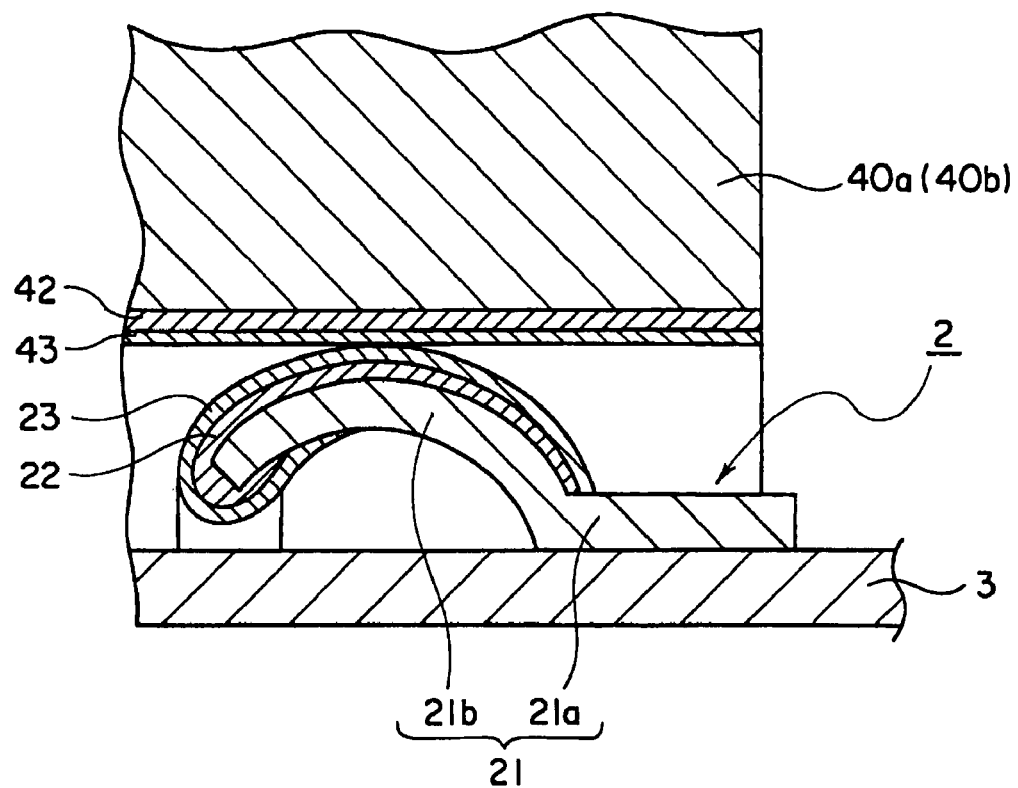
FIG. 4 is a cross-sectional view of principle parts of a tube seal according to another embodiment of the present invention.

The second embodiment shown in FIG. 4 has a configuration and action similar to those of the above-mentioned first embodiment except for the following. Overlapping explanations will be omitted.

In the present embodiment, unlike the first embodiment, the parts of the first and second channel forming members 4a, 4b contacting the lubricating film 23 of the flexible part 21b (seal surfaces) are formed with a porous coating layer 42, and this porous coating layer 42 is formed with a lubricating film 43. That is, in the present embodiment, not only the seal surfaces of the seal part 2 of the tube seal 1, but also the seal surfaces of the first and second channel forming members 4a, 4b are formed with a porous coating layer and lubricating film.

In the present embodiment, the opposing members, that is, the first and second channel forming members 4a, 4b, are also formed in advance with a porous coating layer 42 and lubricating film 43. For this reason, even in the unused state where there has been no sliding at a high temperature, the seal surfaces between the seal part 2 and the first and second channel forming members 4a, 4b can be formed with lubricating surfaces comprised of a soft material. Note that in the present embodiment, the lubricating film 23 of the flexible part 21b and the lubricating films 43 of the first and second channel forming members 4a, 4b preferably have thicknesses of half of so the thicknesses of the first embodiment.

Third Embodiment

Figure 5:
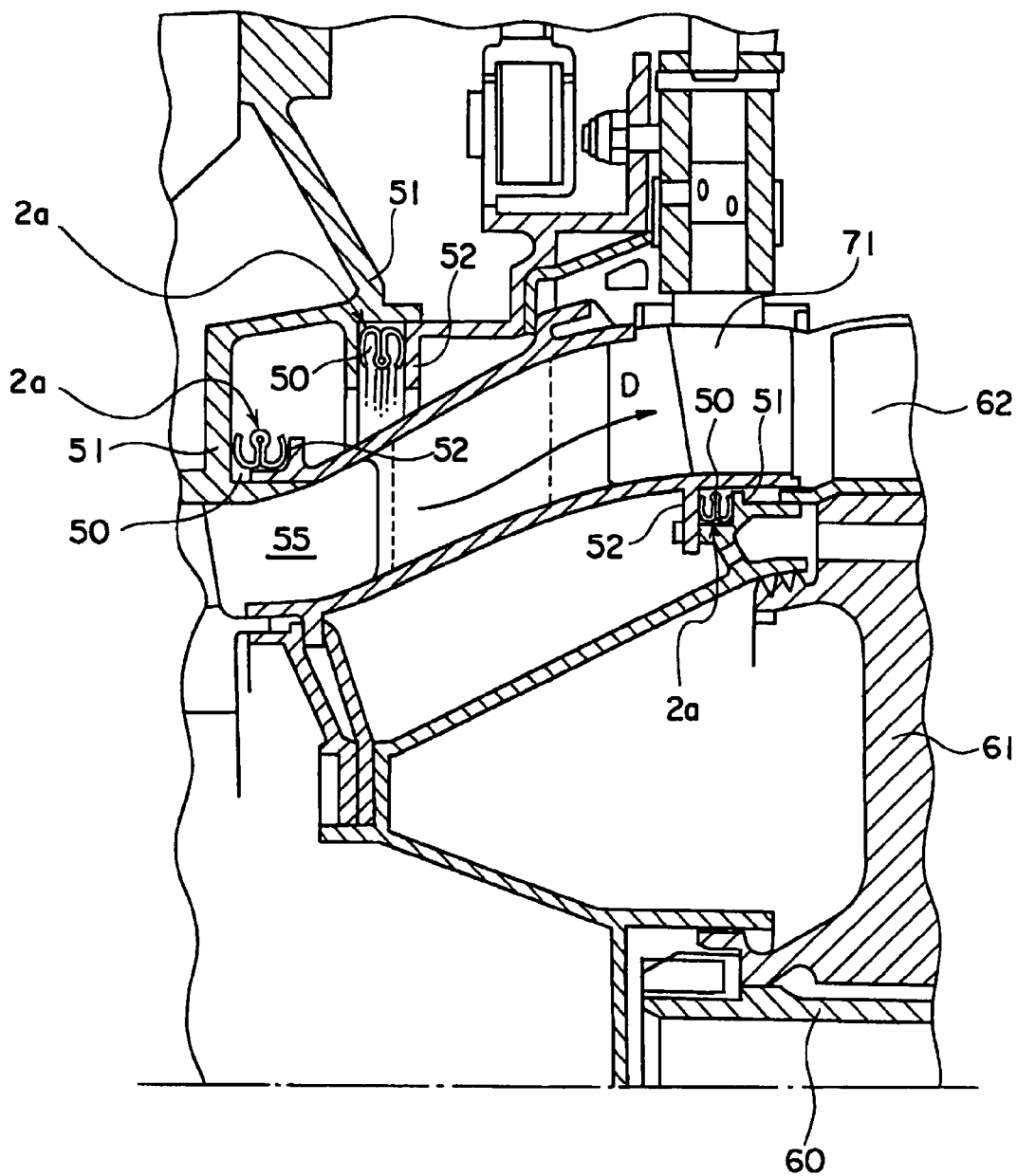
FIG. 5 is a cross-sectional view of a gasket according to another embodiment of the present invention attached to part of a gas turbine.

The third embodiment shown in FIG. 5 is a cross-sectional view showing the state of a gasket 2a of the present embodiment attached near the turbine nozzle assembly of the gas turbine.

In FIG. 5, a rotary disk 61 attached to a shaft 60 is provided with a first blade 62, while a channel 55 is provided with a second blade 71. Further, the gas D sent from the combustion chamber (not shown) is accelerated by the rotation of the first and second blades 62, 71.

In FIG. 5, a plurality of assembly parts 51, 52 are arranged near the channel 55. The mounting grooves 50 formed between these assembly parts 51, 52 are fit with gaskets 2a of the present embodiment having W-shaped cross-sectional shapes. These assembly parts 51, 52 are deformed by the heat of the high temperature gas D and receive vibration due to the rotation of the shaft 60. Therefore, in the present embodiment, the deformation and vibration are absorbed by fitting the mounting grooves 50 with gaskets 2a of the present embodiment.

The gaskets 2a of the present embodiment are formed with porous coating layers and lubricating films at the seal surfaces contacting the assembly parts 51, 52 in the same way as the above-mentioned first embodiment. For this reason, it is possible to obtain actions and effects similar to those of the above-mentioned first embodiment.

In the above way, the tube seal and gasket of the present invention are particularly effective in the case of use in a high temperature and high pressure environment at a location accompanied with relative sliding. For this reason, they can be suitably used as the tube seal 1 (first and second embodiments) and gasket 2a (third embodiment) used at the locations accompanied with relative sliding described above. Note that the tube seal and gasket of the present invention may be any ones used at locations accompanied by relative sliding under a high temperature, high pressure environment and are not limited to the above-mentioned embodiments.

For example, in the above-mentioned embodiments, a tube seal 1 and gasket 2a were illustrated, but the invention may be applied to any seal part having the above porous coating layer and lubricating film. By adopting this configuration, the actions and effects of the present invention can be exhibited.

EXAMPLES

Below, the present invention will be explained based on more detailed examples, but the present invention is not limited to these examples.

Example 1

Figure 6:
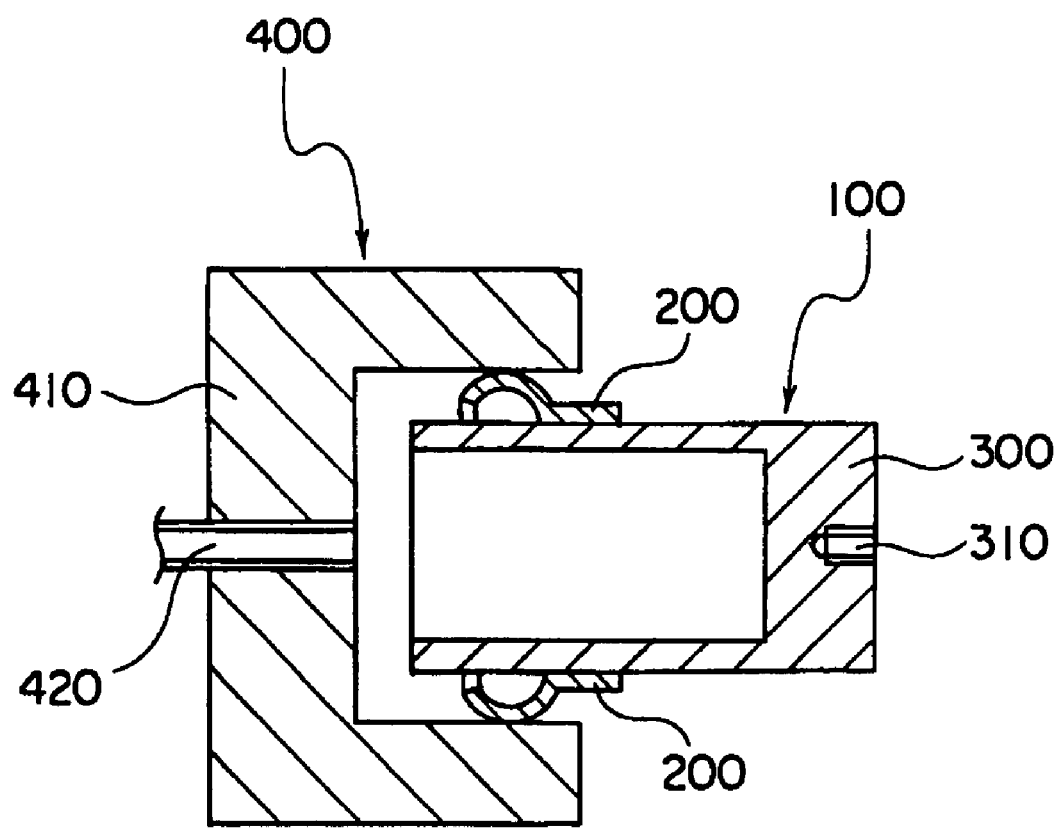
FIG. 6 is a cross-sectional view of a test apparatus used in the examples of the present invention.

In this example, a test apparatus shown in FIG. 6 comprised of a seal device 100 and a bore 400 was fabricated and the seal surface formed by the seal part 200 formed at the outer circumference of the body 300 of the seal device 100 and the inner circumference of the body 410 of the bore 400 was evaluated. The test apparatus comprised of seal device 100 and bore 400 is an apparatus for testing the seal surfaces of the tube seal and gasket of the present invention and provided an environment similar to that of the seal surfaces of the tube seal and gasket of the present invention.

In the test apparatus shown in FIG. 6, the seal device 100 and bore 400 formed cylindrical shapes with sealed first ends. The seal device 100 and bore 400 were assembled with the other opened ends facing each other.

Further, the seal device 100 had a screw hole 310 for attaching a rod to the body 300. By attaching a rod connected to an actuator to this screw hole 310, a structure able to move in the axial direction was formed. On the other hand, the bore 400 had a pipe 420 for carrying fluid to the space formed by the bore 400 and seal device 100 at the body 410. The fluid filled in the space could be freely adjusted in temperature and pressure. Note that the outside diameter of the seal part 200 of the seal device 100 and the inside diameter of the body 410 of the bore 400 were both made φ50 mm.

In this example, as the base material of the seal part 200 (corresponding to the base material 21 of the FIG. 2), a nickel base alloy containing nickel as its main ingredient and chromium, iron, niobium, molybdenum, and titanium was used. Further, the outer surface (seal surface) of the flexible part of the seal part 200 (corresponding to the flexible part 21b of FIG. 2) was formed with a porous coating layer (corresponding to the porous coating layer 22 of FIG. 2). Further, this was formed with a lubricating film (corresponding to the lubricating film 23 of FIG. 2).

The porous coating layer was formed using a flame spraying material comprised of a cobalt based alloy containing cobalt as its main ingredient and chromium, molybdenum, and silicon by the high velocity oxygen flame spraying method. Further, the lubricating film was formed by silver plating the porous coating layer comprised of the cobalt based alloy. Note that in the present example, the thickness of the porous coating layer was made 50 μm, and the thickness of the lubricating film was made 20 μm.

Further, as the body 410 of the bore 400 forming the opposing side sliding member, a nickel based alloy containing nickel as its main ingredient and chromium, molybdenum, niobium, and iron was used.

Figure 10A:
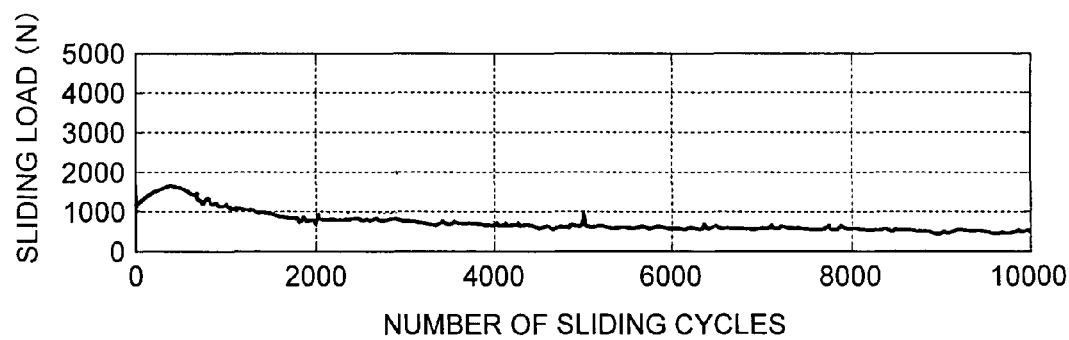
FIG. 10A is a graph showing the relationship between the number of sliding cycles and the sliding load of a seal part according to Example 1 of the present invention.
Figure 10B:
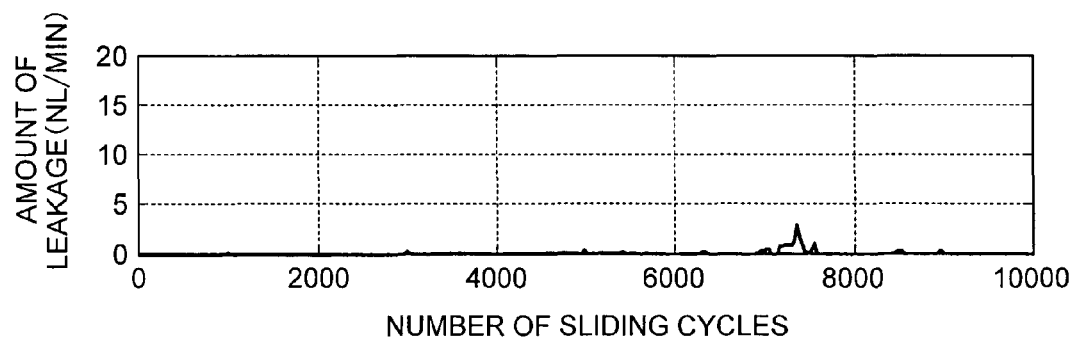
FIG. 10B is a graph showing the relationship between the number of sliding cycles and the amount of leakage of a seal part according to Example 1 of the present invention.

Next, the fabricated test apparatus was used for a total 10000 cycle sliding test under sliding test conditions of a temperature of 510° C., a fluid of air, a fluid pressure of 2.1 MPa, a sliding speed of 4.5 mm/sec, and a reciprocal sliding in the axial direction of 4.5 mm as one cycle. In this sliding test, the sliding load in the axial direction and amount of fluid leakage during the test were measured for the evaluation. The obtained results are shown in FIG. 10A and FIG. 10B.

Figure 7:
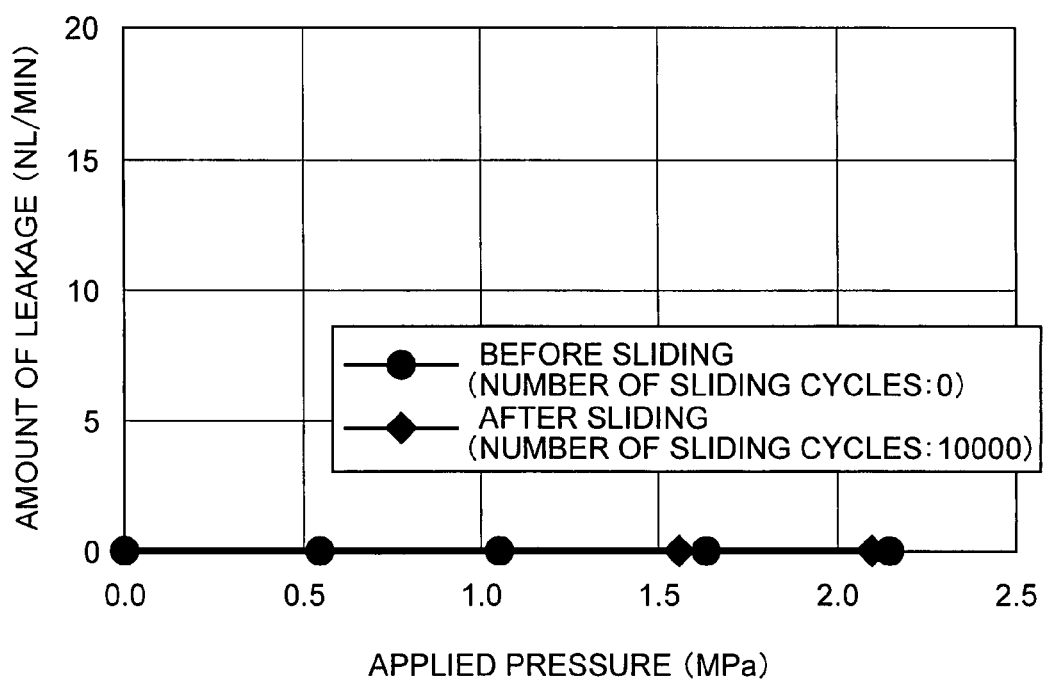
FIG. 7 is a graph showing the relationship between the pressing force and amount of leakage of a seal part according to Example 1 of the present invention.

Further, in the present example, along with the sliding test, the amounts of fluid leakage (amounts of leakage) in the case of changing the applied pressure were measured for the test apparatus before and after the sliding test. The obtained results are shown in FIG. 7.

Comparative Example 1

Figure 8:
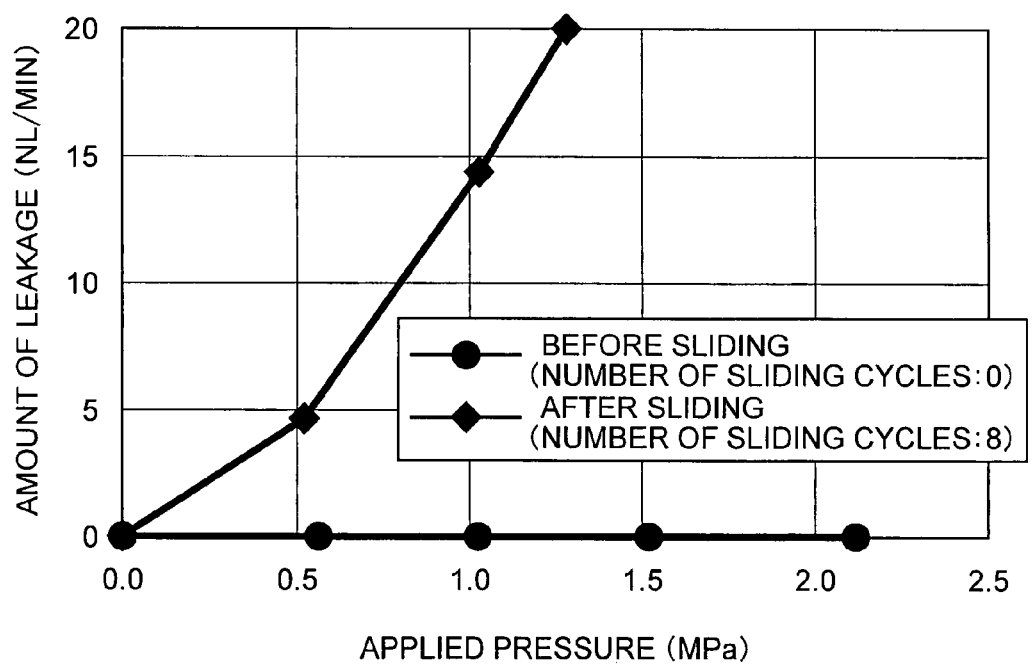
FIG. 8 is a graph showing the relationship between the pressing force and amount of leakage of a seal part according to Comparative Example 1 of the present invention.

Except for not forming the lubricating film at the flexible part of the seal part 200, the same procedure was followed as in Example 1 to fabricate the test apparatus of Comparative Example 1 shown in FIG. 6. Further, the same procedure was followed as in Example 1 to conduct a sliding test and measure the amounts of fluid leakage before and after the sliding test. The measurement results of the amounts of fluid leakage before and after the sliding test are shown in FIG. 8. Note that in Comparative Example 1, the seal surface was seriously damaged and the amount of fluid leakage became remarkably large, so the sliding test was ended in 8 cycles.

Comparative Example 2

Figure 9:
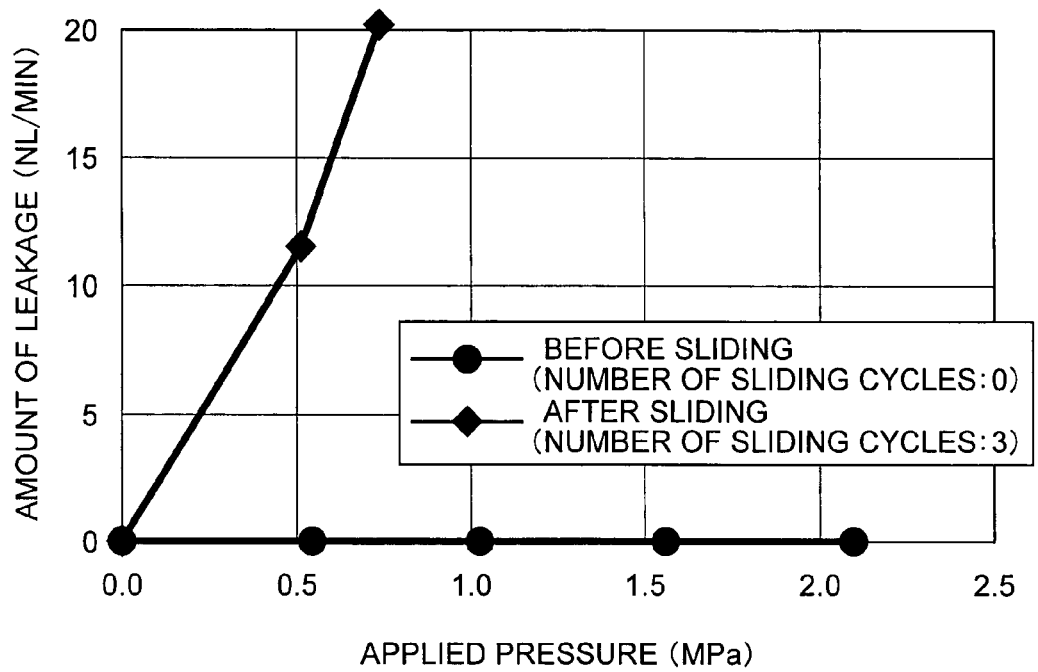
FIG. 9 is a graph showing the relationship between the pressing force and amount of leakage of a seal part according to Comparative Example 2 of the present invention.

Except for not forming the porous coating layer and lubricating film at the flexible part of the seal part 200, the same procedure was followed as in Example 1 to fabricate the test apparatus of Comparative Example 2 shown in FIG. 6. Further, the same procedure was followed as in Example 1 to conduct a sliding test and measure the amounts of fluid leakage before and after the sliding test. The measurement results of the amounts of fluid leakage before and after the sliding test are shown in FIG. 9. Note that in Comparative Example 2, the seal surface was seriously damaged and the amount of fluid leakage became remarkably large, so the sliding test was ended in 3 cycles.

Example 2

Figure 11:
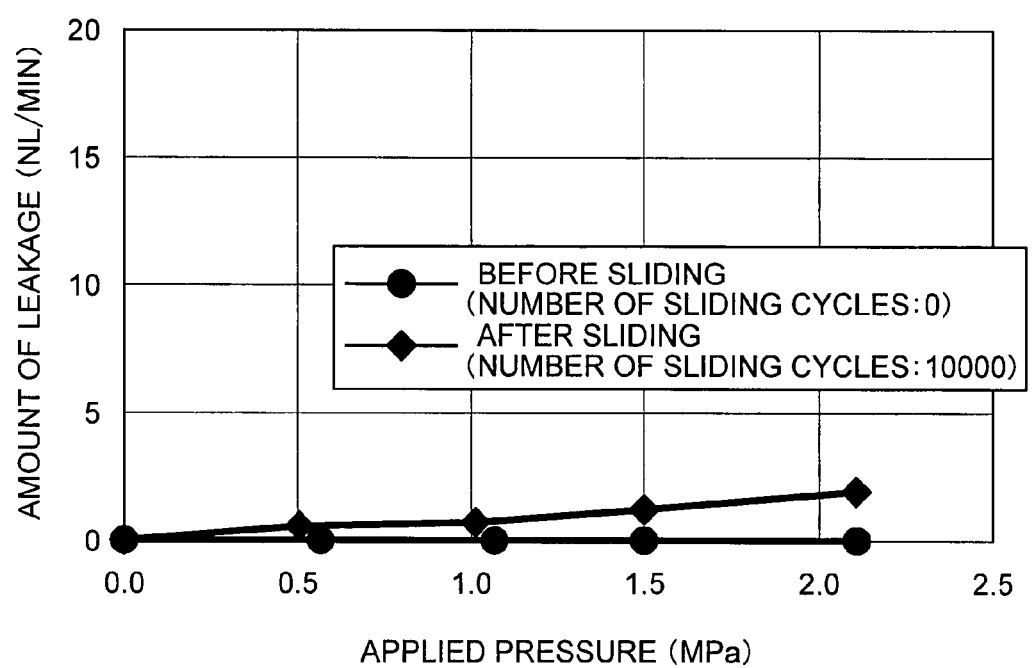
FIG. 11 is a graph showing the relationship between the pressing force and amount of leakage of a seal part according to Example 2 of the present invention.

Except for plating the porous coating layer comprised of the cobalt based alloy with a gold-cobalt alloy so as to form a lubricating film of a thickness of 5 μm at the flexible part of the seal part 200, the same procedure was followed as in Example 1 to fabricate the test apparatus of Example 2 shown in FIG. 6. Further, the fabricated test apparatus was used for the same procedure as in Example 1 to conduct a sliding test and measure the amounts of fluid leakage before and after the sliding test. The measurement results of the amounts of fluid leakage before and after the sliding test are shown in FIG. 11.

Comparative Example 3

Figure 12:
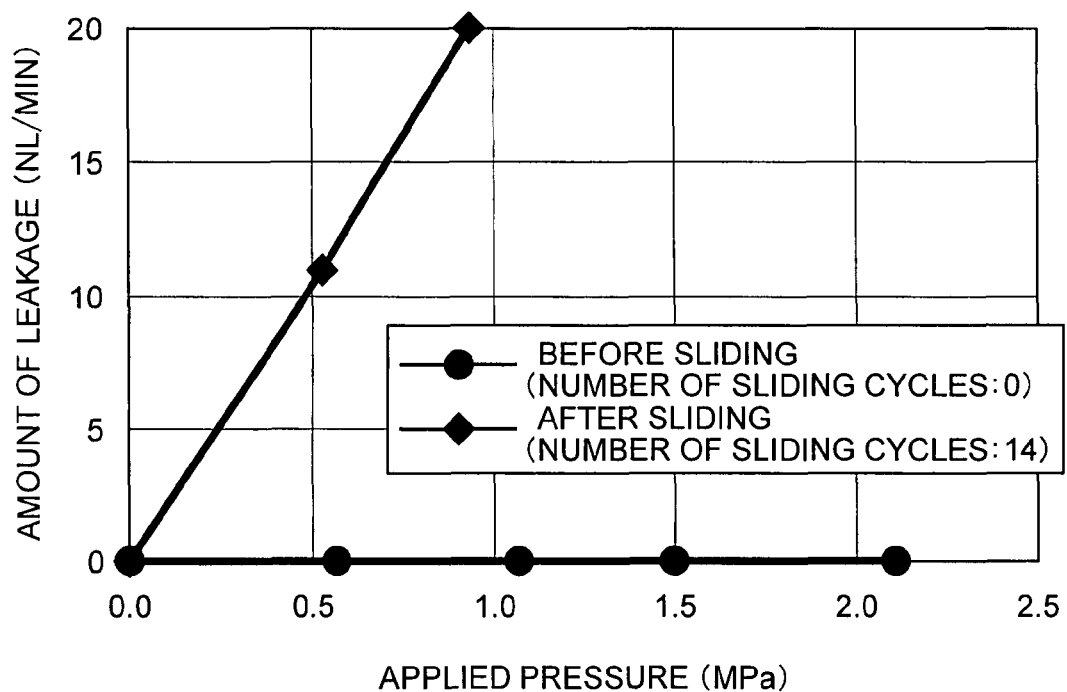
FIG. 12 is a graph showing the relationship between the pressing force and amount of leakage of a seal part according to Comparative Example 3 of the present invention.

Except for plating a porous coating layer comprised of a cobalt based alloy with a silver indium alloy so as to form a lubricating film of a thickness of 20 μm on the flexible part of the seal part 200, the same procedure was followed as in Example 1 to fabricate the test apparatus of Comparative Example 3 shown in FIG. 6. Further, the fabricated test apparatus was used for the same procedure as in Example 1 to conduct a sliding test and measure the amounts of fluid leakage before and after the sliding test. The measurement results of the amounts of fluid leakage before and after the sliding test are shown in FIG. 12. Note that in Comparative Example 3, the seal surface was seriously damaged and the amount of fluid leakage became remarkably large, so the sliding test was ended in 14 cycles.

Comparative Example 4

Figure 13:
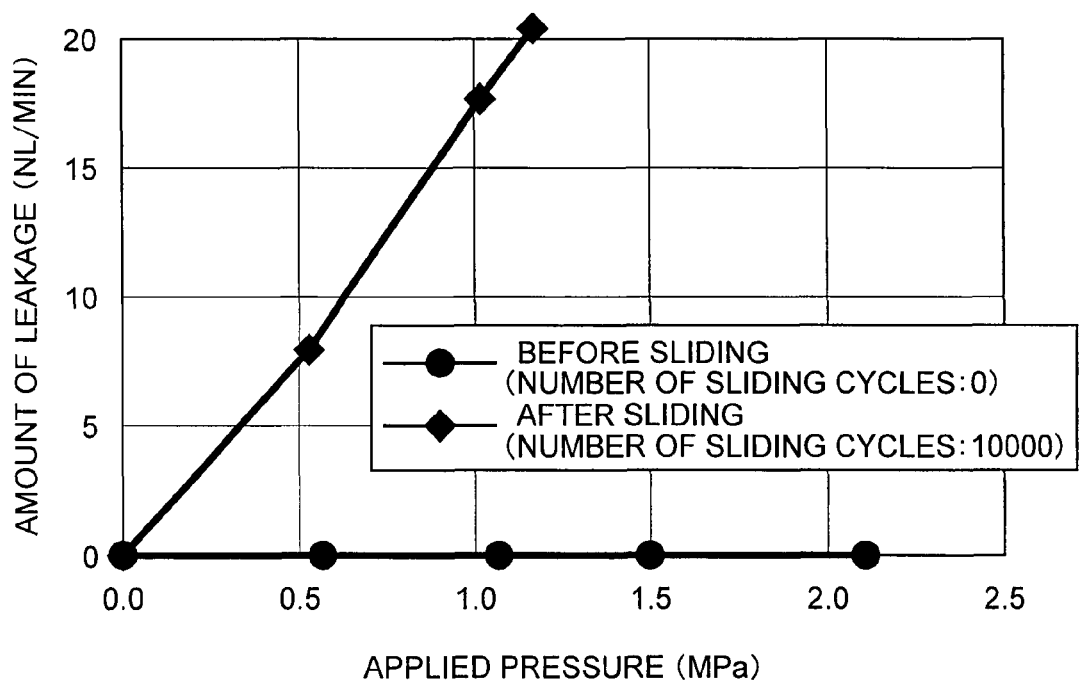
FIG. 13 is a graph showing the relationship between the pressing force and amount of leakage of a seal part according to Comparative Example 4 of the present invention.

Except for not forming a porous coating layer on the flexible part of the seal part 200, the same procedure was followed as in Example 1 to fabricate the test apparatus of Comparative Example 4 shown in FIG. 6. That is, in Comparative Example 4, the base material was directly silver plated to form a lubricating film. Further, the fabricated test apparatus was used for the same procedure as in Example 1 to conduct a sliding test and measure the amounts of fluid leakage before and after the sliding test. The measurement results of the amounts of fluid leakage before and after the sliding test are shown in FIG. 13.

TABLE 1

|  | Porous coating layer | Lubricating film |
| --- | --- | --- |
| Ex. 1 | Cobalt based alloy | Silver |
| Comp. Ex. 1 | Cobalt based alloy | — |
| Comp. Ex. 2 | — | — |
| Ex. 2 | Cobalt based alloy | Gold-cobalt alloy |
| Comp. Ex. 3 | Cobalt based alloy | Silver indium alloy |
| Comp. Ex. 4 | — | Silver |

In the table, "—" means no porous coating layer of lubricating film was formed.

Evaluation 1

Table 1 shows the porous coating layer and lubricating film formed in Examples 1 and 2 and Comparative Examples 1 to 4. Note that the "-" in the table shows no porous coating layer or lubricating film was formed.

As shown in FIG. 7, in Example 1 forming a porous coating layer and lubricating film, despite a 10000 cycle sliding test being performed, there was almost no change in the amount of fluid leakage between before and after the sliding test, that is, good results were obtained. Similarly, from FIG. 11, in Example 2 forming the lubricating film by a gold-cobalt alloy, there was little fluid leakage after the 10000 cycle sliding test, that is, good results were obtained.

On the other hand, as shown in FIG. 8, in Comparative Example 1 forming only the porous coating layer, despite the fact that the sliding test was performed for only 8 cycles, an increase in the applied pressure led to an increase in the amount of leakage after sliding test. Further, this trend, as shown in FIGS. 9 and 12, was similarly seen in Comparative Example 2 not forming either the porous coating layer or lubricating film and in Comparative Example 3 forming the lubricating film by a silver indium alloy. In particular, in Comparative Example 2, the increase in the amount of leakage along with an increase in the applied pressure was remarkable.

Further, in Comparative Example 4 not forming a porous coating layer, but directly forming a silver plating layer on the base material, a 10000 cycle sliding test could be performed, but after the sliding test, the increase in applied pressure led to an increase in the amount of leakage.

From these results, it could be confirmed that by forming a porous coating layer on the seal surface of the base material and forming a lubricating film on this porous coating layer, a tube seal and gasket high in durability and superior in sealability even under a high temperature and high pressure environment can be obtained.

Evaluation 2

FIG. 10A shows the change in the sliding load in the axial direction during a 10000 cycle sliding test of Example 1, while FIG. 10B shows the change in the amount of fluid leakage during the sliding test From FIG. 10A, it is learned that in Example 1, during the sliding test, the sliding load is gradually reduced and stabilizes around over 2000 cycles. Further, from FIG. 10B, it is learned that in Example 1, during the sliding test, almost no leakage of fluid was observed and the amount of leakage was constantly state. Note that in FIG. 10B, the amount of fluid leakage increased in some parts, but this was due to leakage of fluid at the test apparatus and has no relation with the performance of the seal part 200 of Example 1.

Figure 14A:
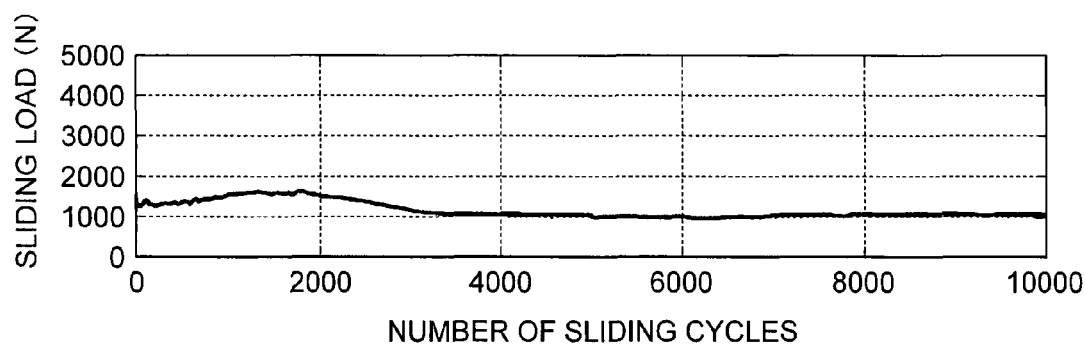
FIG. 14A is a graph showing the relationship between the number of sliding cycles and the sliding load of a seal part according to Example 2 of the present invention.
Figure 14B:
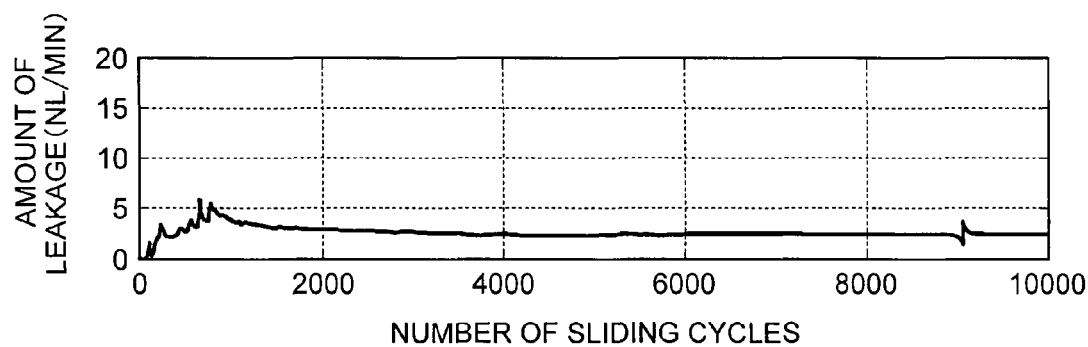
FIG. 14B is a graph showing the relationship between the number of sliding cycles and the amount of leakage of a seal part according to Example 2 of the present invention.
Figure 15A:
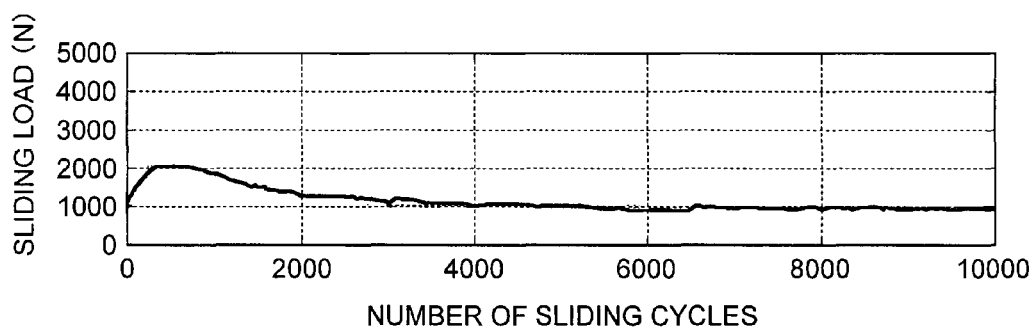
FIG. 15A is a graph showing the relationship between the number of sliding cycles and the sliding load of a seal part according to Comparative Example 4 of the present invention.
Figure 15B:
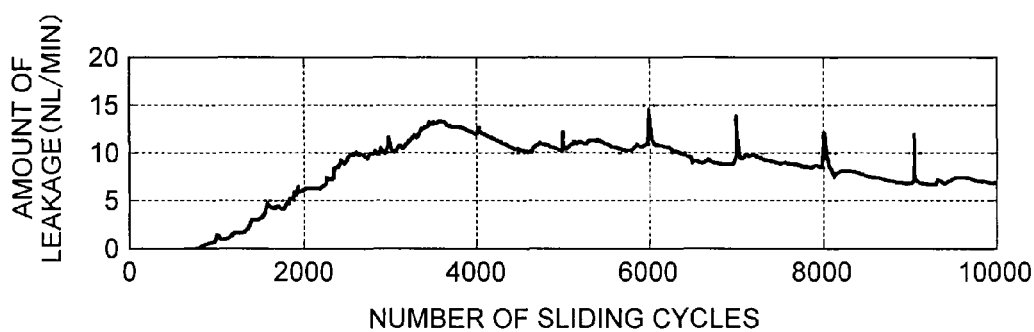
FIG. 15B is a graph showing the relationship between the number of sliding cycles and the amount of leakage of a seal part according to Comparative Example 4 of the present invention.

Similarly, FIG. 14A shows the change in the sliding load in the axial direction during a 10000 cycle sliding test of Example 2, FIG. 14B shows the change in the amount of fluid leakage during the sliding test, FIG. 15A shows the change in the sliding load in the axial direction during a 10000 cycle sliding test of Comparative Example 4, and FIG. 15B shows the change in the amount of fluid leakage during the sliding test.

From FIG. 14A and FIG. 14B, in Example 2, some leakage of fluid was observed after the start of the sliding test, but almost no leakage of fluid was observed from around after 1000 cycles, i.e., the amount of leakage became stable.

On the other hand, from FIG. 15A and FIG. 15B, in Comparative Example 4, continuation of the sliding test for 10000 cycles was possible, but the amount of leakage became great during the sliding test.

From these results, it could be confirmed that a stable seal performance can be exhibited at the seal surface of the seal part of the present invention even when the number of sliding cycles is increased in a sliding test under a high temperature, high pressure environment.

INDUSTRIAL APPLICABILITY

As explained above, the seal part of the present invention has a superior durability and sealability, long life, and high reliability even when used under a high temperature (for example 400° C. or more, in particular 400 to 600° C.) and high pressure (for example 2 MPa or more) environment, so can be suitably used for locations accompanied with relative sliding under a high temperature, high pressure environment.

The invention claimed is:

1. A tube seal having a tubular body and a seal part, wherein said seal part comprises:
   a base material;
   a porous coating layer formed by flame spraying a hard material on a seal surface of said base material, wherein said base material and said porous coating layer are free of any movement relative to each other; and
   a lubricating film provided on said porous coating layer, wherein said porous coating layer and said lubricating film are free of any movement relative to each other, said lubricating film containing at least one material selected from silver, gold, tin, and a gold-cobalt alloy,
   wherein a thickness of said porous coating layer is 10 to 200 μm and a thickness of said lubricating film is 1 to 50 μm, wherein said seal part defines a seal surface and includes a fixed part configured to have a tubular shape and a flexible part that is deformable in a radial direction, and wherein an intermediate channel is defined in a hollow part of the tubular body of said tube seal, wherein fluid is able to freely flow through said intermediate channel, which is located between and in communication with a first channel defined by a first channel forming member and a second channel defined by a second channel forming member.

2. The tube seal according to claim 1, wherein said flame spraying material contains at least one material selected from a nickel based alloy, a cobalt base alloy, chromium carbide, and a tungsten carbide.

3. The tube seal according to claim 1, wherein said base material comprises a nickel based alloy.

4. The tube seal according to claim 1, wherein said seal part Is used in a temperature range of 400 to 600° C.

5. The tube seal according to claim 1, wherein said seal part is disposed between an outer circumferential surface of said tubular body and an inner surface of one of said first channel forming member and said second channel forming member.

6. The tube seal according to claim 1, wherein said flexible part of said seal part is arcuate in shape and extends from an end of said fixed part.

* * * * *